March 14, 1961

W. WHIPPLE, JR 2,974,627

LOW-SPEED MARINE PROPULSION UNIT

Filed April 7, 1959

INVENTOR
*WILLIAM WHIPPLE, Jr.*

BY
*Watson, Cole, Grindle & Watson*
ATTORNEY

INVENTOR
WILLIAM WHIPPLE, Jr.

BY Watson, Cole, Grindle & Watson
ATTORNEY

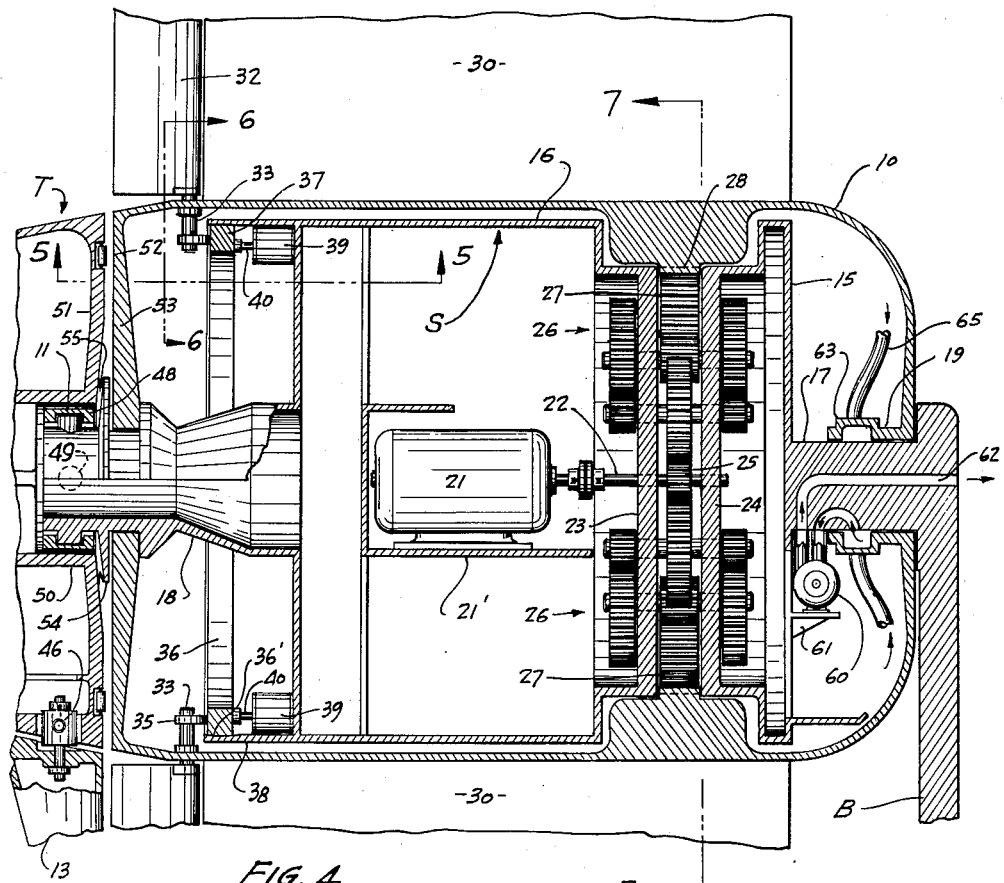
FIG. 4
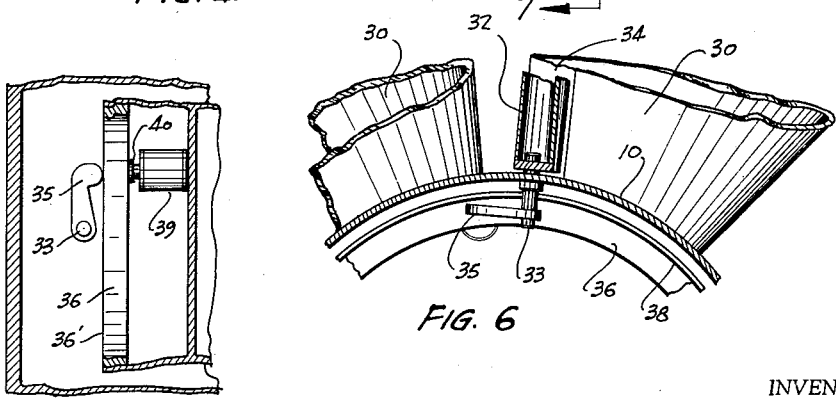
FIG. 5
FIG. 6

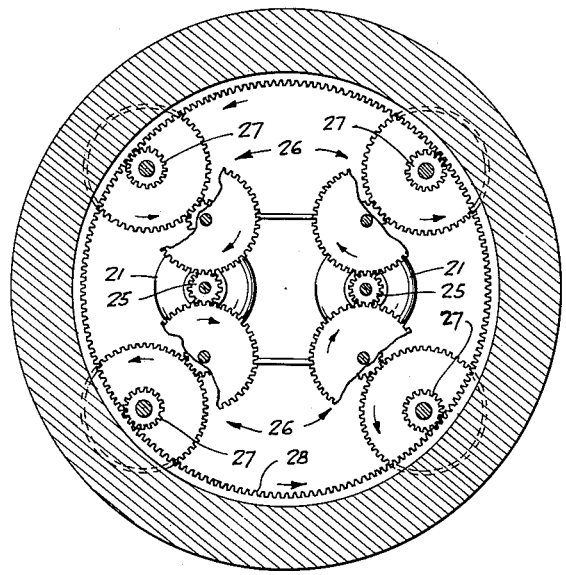
FIG. 7
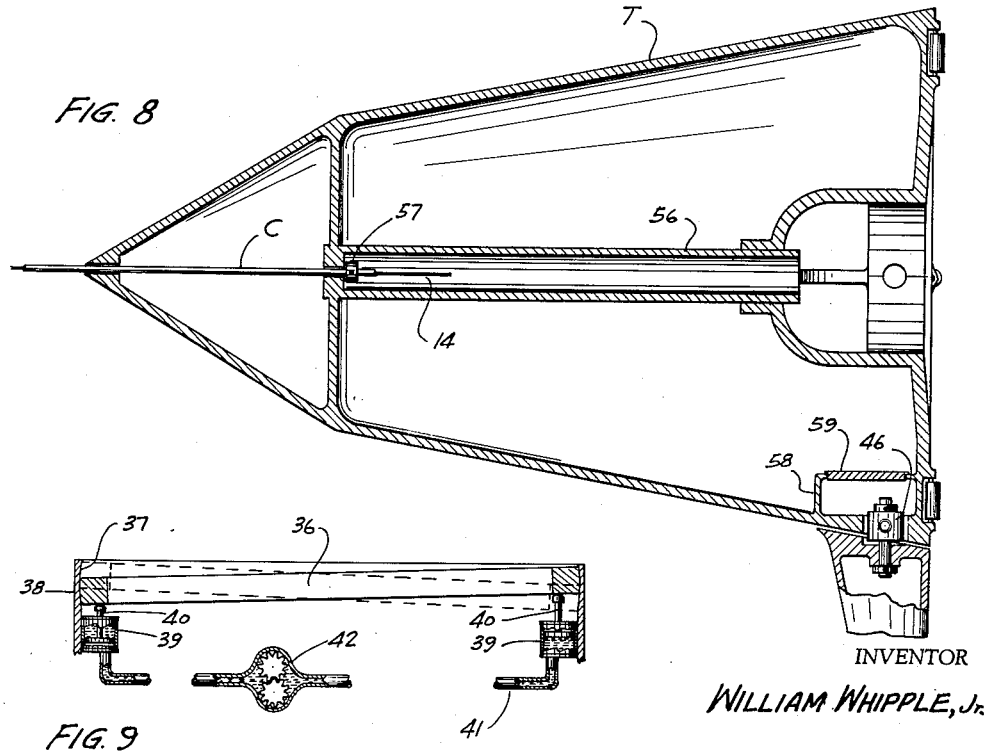
FIG. 8
FIG. 9
INVENTOR
WILLIAM WHIPPLE, Jr.
BY
Watson, Cole, Grindle & Watson
ATTORNEY March 14, 1961 W. WHIPPLE, JR 2,974,627
LOW-SPEED MARINE PROPULSION UNIT
Filed April 7, 1959 7 Sheets-Sheet 5

INVENTOR
WILLIAM WHIPPLE, Jr.

BY
Watson, Cole, Grindle & Watson
ATTORNEY

March 14, 1961 W. WHIPPLE, JR 2,974,627
LOW-SPEED MARINE PROPULSION UNIT
Filed April 7, 1959 7 Sheets-Sheet 6

INVENTOR
WILLIAM WHIPPLE, Jr.

BY
Watson, Cole, Grindle & Watson
ATTORNEY

March 14, 1961 W. WHIPPLE, JR 2,974,627
LOW-SPEED MARINE PROPULSION UNIT
Filed April 7, 1959 7 Sheets-Sheet 7

INVENTOR
WILLIAM WHIPPLE, Jr.

BY
Watson, Cole, Grindle & Watson
ATTORNEY

United States Patent Office 2,974,627
Patented Mar. 14, 1961

2,974,627
LOW-SPEED MARINE PROPULSION UNIT
William Whipple, Jr., Dallas, Tex.
(Cedar Swamp Road, Glen Head, N.Y.)
Filed Apr. 7, 1959, Ser. No. 804,806
18 Claims. (Cl. 115—20)

This invention relates to a mechanically efficient submerged screw unit for towing through the water very large slow moving masses or bodies.

The present invention is an improvement on the Cylindroid Tug disclosed in my Patent No. 2,655,890 granted October 20, 1953. As explained in substance in that patent extremely large and bulky towed objects must be moved at slow speeds in order to obtain reasonable economy and such economy is not obtainable by use of conventional screw propelled tugs which must propel water to the rear at high velocity in order to develop full power. It is this very fact which results in lack of economy of operations since the efficiency of the screw propellers falls off quite appreciably when the velocity of the water ejected by the screw exceeds a ratio of more than four to five times the speed of propulsion of the screw through the water.

While a slowly rotating large diameter submerged screw unit or cylindroid tug such as disclosed in my aforesaid patent does achieve the desired economy of operation it has been realized that propulsion units of this type such as heretofore known have been quite difficult to steer and maneuver due to the fact that their axial length has been required to be considerably greater than the overall diameter of their rotating screw portions. Such relative proportions of the length and diameter have in the past been necessary in order to secure stability of the unit in the water. Obviously an inversion of these proportions might tend to cause the units to assume a natural floating position in which its rotational axis is vertical rather than in horizontal position as is of course required.

In the present invention, however, it has been found practical to provide a substantially submerged screw or propeller type aquatic propulsion unit in which the diameter of the rotating propeller portion may very considerably exceed its axial length. At the same time it has been found possible not only to secure the necessary stability of the unit when in operation but also to very substantially increase its maneuverability and in fact to render it capable not only of steering in a lateral plane but also capable of a certain degree of vertical steering as might be desired to vary the depth at which it operates under water. In fact in the preferred embodiment the propeller unit is universally angularly adjustable about a point coincident with its rotational axis whereby it may be controlled to maintain its substantially vertical disposition at all times.

To this end the unit of the invention consists essentially of a partially or wholly submerged slightly buoyant screw propeller equipped with small auxiliary power controlled devices, such as changeabe pitch blades or blade portions and means for controlling these to vary the pitch thereof individually and successively in accordance with the angular or rotational position of each such blade portion. Thus, by changing the pitch of these several blade portions or auxiliary devices at different angular positions throughout their rotary movement with the propeller, provision is made both for lateral steering movement as well as for depth control purposes.

Since these auxiliary devices or blade portions may inherently be used to maintain the stability of the propeller unit so that it rotates in a substantially vertical plane, it will be apparent that it is accordingly rendered possible and practical to proportion the propeller unit so that its overall diameter may greatly exceed its axial dimension. Because of the dimensions thus obtainable it becomes possible to construct the unit with a far larger thrust area in proportion to its overall size than has heretofore been practical. This in turn permits an increase in the pulling power of the unit proportionately to its overall size.

It will be apparent that the overall diameter of the unit may in practice become so great as to exceed the depth of the channels into various harbors and anchorages. In such cases however, upon arrival at this point, the towing function can be taken over by more conventional units and the propulsion unit of the invention may be turned to a position wherein its rotational axis is vertical and towed through the said relatively shallow channels or areas in this position by conventional tugs. It will be seen that in this position the draft of the unit will be very substantially reduced over its draft when in normal operative position with its rotational axis horizontal.

In this application there are specifically shown and described only two embodiments of the invention. However it will be readily appreciated that the invention is capable of embodiment in other forms and that its several details may be readily changed in various obvious manners all without departing from the invention as defined in the appended claims.

In the accompanying drawings:

Figure 4 is an enlarged detailed cross section on the line 4—4 of Figure 2 showing the interior construction with the rank of the components within the stator of the propulsion unit.

Figure 5 is a detailed fragmentary section on the line 5—5 of Figure 4.

Figure 6 is a detailed fragmentary section on the line 6—6 of Figure 4.

Figure 7 is a cross section on the line 7—7 of Figure 4.

Figure 8 is a vertical axial section through the tail portion of the unit.

Figure 9 is a generally diagrammatic view, partly in elevation and partly in section, showing the universally adjustable control cam for the changeable pitch propeller blade portions of the unit, together with one of the sets of hydraulic control mechanisms for tilting the said cams.

Figure 1:
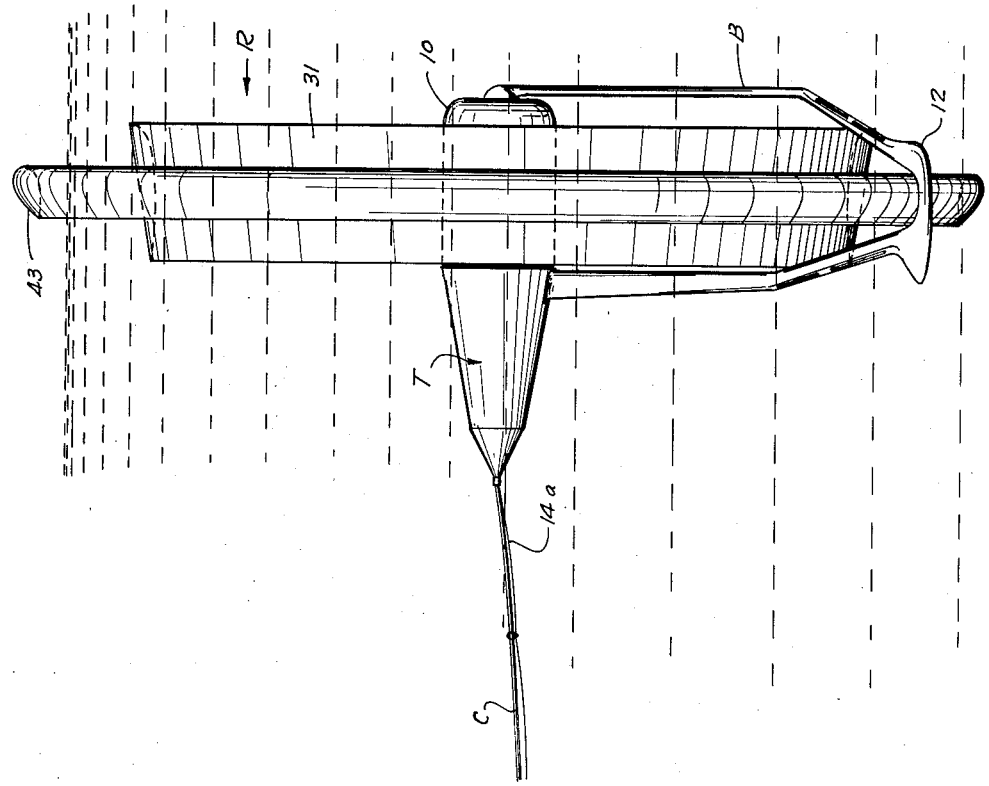
Figure 1 represents a side elevation, partially broken away, showing the preferred embodiment of the screw propulsion unit of the invention together with its float auxiliary, both of these being illustrated as almost completely submerged in their usual operative positions in the water.
Figure 1:
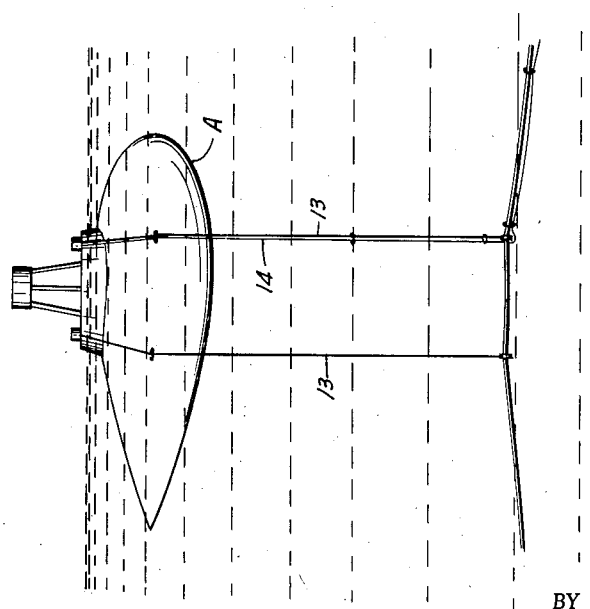
Figure 2:
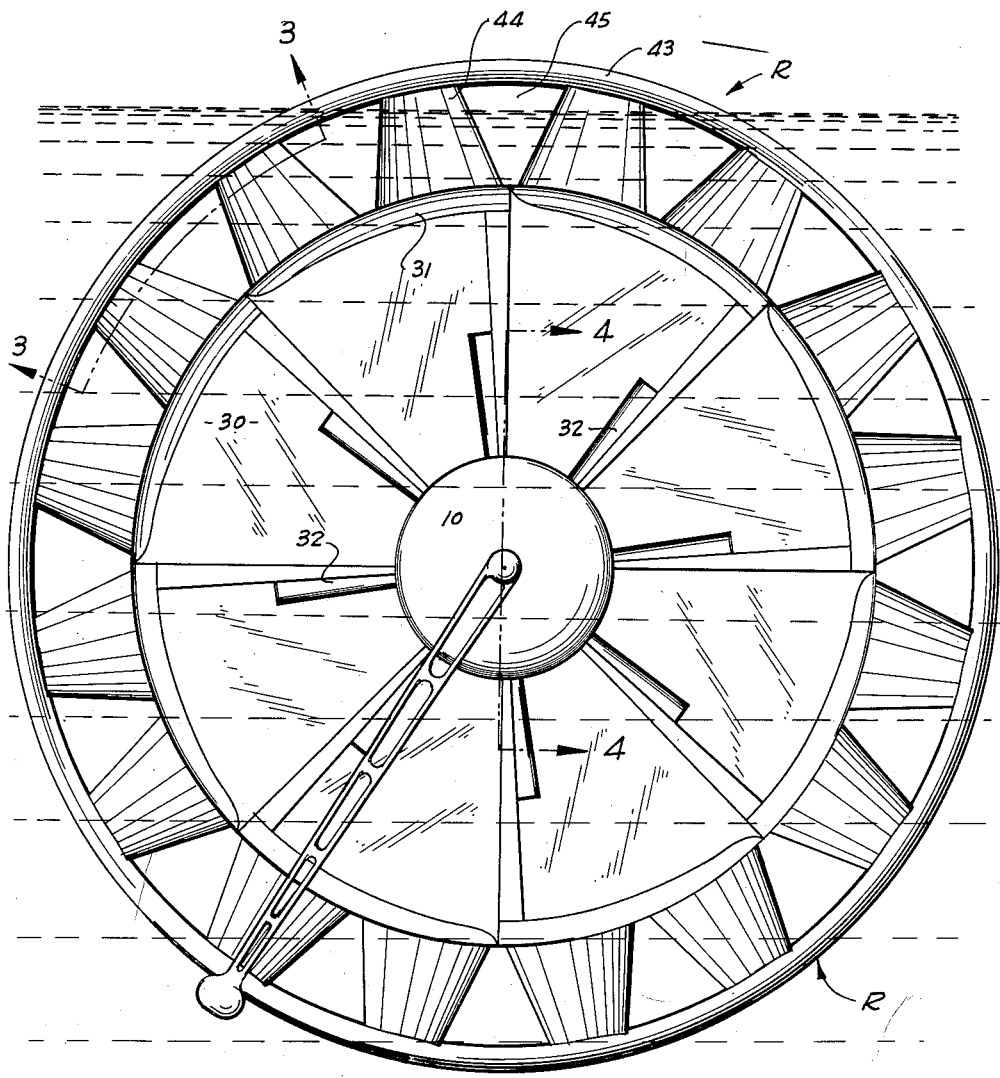
Figure 2 is a front end elevation of the propulsion unit.
Figure 3:
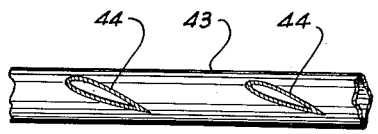
Figure 3 is a detailed section on the line 3—3 of Figure 2.

Referring now in detail to the accompanying drawings the general overall organization of the several components is best illustrated, as to the preferred embodiment of the invention, in Figures 1 and 2. In these the reference character R designates in its entirety the propeller element or rotor of the invention, which has a central hub 10 by means of which it is mounted for rotation about the horizontal axis of a generally cylindrical stator S which is best shown in Figure 4. In the preferred embodiment of the invention the stator S includes a trailing tail portion T which is preferably articulately connected thereto, for universal movement in order to avoid interference with the steering and or depth controlling movements of the rotor R per se.

The usual tow cable C extends rearwardly in axially trailing relation from this tail section T and may be connected at its rearward end to any towed object, not shown in the present drawings. By virtue of this relationship it will be seen that the tension of the cable will tend to maintain the tail section T in axial alignment with it, but that the rotor R will be free for at least limited universal angular movement relative to the line of draft because of its articulated connection to the tail section T. The said articulated connection is exemplified by the universal joint 11 of Figure 4 which will be described in more detail hereinafter.

In this particular embodiment the driving means for the rotor is housed within the stator S and consequently it is necessary to provide some suitable means for preventing reactionary counter rotation of the stator S itself. Such means obviously may assume various forms, though in the present embodiment it is exemplified by the radial bifurcated torque arm or Ballast B having a weight 12 at its radially outermost lower end interconnecting its two legs.

For use in conjunction with the propulsion unit of the invention it will be desirable in many instances to provide an auxiliary surface float or control unit A connected to the tow cable C by one or more depending auxiliary tow lines 13. These lines 13 in addition to connecting the float A for movement with the propulsion unit serve to provide a medial support for the main tow line C. The primary purpose of the auxiliary float A will be to provide observation and navigation facilities above the surface of the water. Also the float auxiliary may contain a power plant in the form of an electric generator serving as the main supply of power for the driving means of the propulsion unit. To this end an auxiliary conduit 14 may interconnect the auxiliary float A with the interior of the propulsion unit and suitable electric power lines, communication lines etc., may run through this conduit to the propulsion unit. However, this arrangement is not essential as obviously the propulsion unit may be driven by a source of atomic power housed directly within said unit, or by an internal combustion engine therein or the like.

Adverting now to a somewhat more detailed explanation of the general organization of elements as thus far described, attention is directed first to the structure of the stator S. Referring particularly to Figure 4 it will be seen that this stator is of generally cylindrical configuration including axially alined rigidly interconnected front and rear sections 15 and 16 respectively and having hollow front and rear axially alined stub shafts 17 and 18 on which are rotatably journaled the bearings 19 and 20 by means of which the hub 10 of the rotor is rotatably mounted on the stator S.

It will be seen that in the instant embodiment rotary driving force is imparted from the stator S to the rotor R by means of one or more prime movers 21 mounted on the supporting bracket 21' within the stator S. The output shaft 22 of each such motor or prime mover is rotatably disposed through the relatively spaced bulkheads 23 and 24 of stator sections 15 and 16. Fixed on each such shaft 22 between the bulkheads 23 and 24 is a drive pinion 25 which transmits rotary movement through chains of reduction gearing 26 to drive gears 27. These gears 27 are in meshing driving relation with an internal ring gear 28 fixed concentrically within the hub 10.

The rotor R, in addition to the hub, comprises a plurality of radial elements preferably in the form of fixed pitch propeller blades 30 rigidly interconnected between the hub 10 and a float ring 31 which is supported concentrically to the said hub and the rotational axis of the rotor. The ring 31 in addition to providing structural reinforcement for the rotor also provides or contributes to its buoyancy, which is so selected that the propulsion unit in its entirety will normally tend to float in almost completely submerged condition as indicated in the drawings.

Fixed on these structural elements or fixed pitch blades 30 for pitch changing adjustment are changeable pitch blades 32.

Within the broad concept of the invention the changeable pitch blades or blade portions 32 may obviously exemplify any means angularly spaced around the rotational axis of the rotor and individually regulable to exert varying eccentric thrusts in different rotational positions around said axis both for lateral steering purposes and for controlling the depth of operation of the rotor R. These relatively angularly spaced variable pitched blades or blade portions 32 of the preferred embodiment are of similar construction. As will be clear by reference to Figures 4 and 6, each of these variable pitch blades 32 has its inner end supported for pitch changing movement on a stub shaft 33 which is rotatably jornaled through the cylindrical wall of the hub 10 to project radially into the interior of said hub. It will be understood that the radially outer end of each such blade 32 may be pivotally supported at its radially outer end on a generally similar stub shaft, or otherwise pivotally connected to the relatively adjoining portion of its associated fixed blade 30. Preferably these blades 32 will be disposed immediately adjoining the trailing edges of the respective fixed blades 30 which may if desired be formed with recesses 34 conformingly receiving their leading edges as indicated in Figure 6. It will further be seen that both the blades 30 and 32 may be of hollow construction to contribute to the overall bouyancy of the device and also to provide communication and drainage passages as more fully described hereinafter.

In order to control the pitch of the blades 32 the stub shafts 33 are provided with rigidly affixed cam followers in the form of radial arms 35 each extending normally to the axis of its respective stub shaft 33 with its free end disposed for engagement with the annular cam surface of a circular swash plate or cam ring 36. This circular cam 36 has its cam surface in a plane which normally will be at right angles to the rotational axis of the rotor R during rectilinear movement of the rotor. However, in order to control the steering of the rotor the cam ring 36 is mounted for universal angular movement relative to the rotational axis of the rotor. To this end the cam ring 36 is provided with a generally spherical outer periphery which is disposed for universal angular movement in the correspondingly shaped inner peripheral portion 37 of the cylindrical extension 38 at the rear end of the stator section 16.

For controlling the angular position of the cam 36 there are provided diametrically opposed pairs of hydraulic cylinders 39 secured on the rear axial bulkhead of the stator section 16 and having plungers 40, the ends of which respectively abut against the front axial face of ring 36 to exert thrust thereagainst.

The hydraulic cylinder and plunger units 39 and 40 of each diametrically opposed pair may be connected into communicating relation with each other by means of a conduit 41, as shown in Figure 9, whereby suitable fluid pumps, such as the gear pump 42 interposed in said line, may simultaneously withdraw hydraulic fluid from one cylinder to permit retraction of its plunger while supplying an equivalent amount of fluid to the other cylinder to cause projection of its plunger. This will obviously result in tilting movement of the ring for instance from the position shown in broken lines in Figure 9 to the position shown in full lines. Normally there will be not only a vertically opposed pair of such cylinder and plunger units 39 and 40 as shown in Figure 4 but also a horizontally opposed pair of such units, together with the interconnecting conduit and gear pump as heretofore described. While it is not essential that the pump employed for controlling these hydraulic units be a gear pump it is essential that it be of a reversible type so that it may function to tilt the ring 36 in either of two directions. The gear pumps 42 or equivalent means may be driven and controlled in any suitable manner which will be readily apparent to those skilled in the art and hence is not specifically described herein.

Thus it will be apparent that by suitably tilting the control ring or cam ring 36 relative to the existing axis of rotation of the rotor R the blades or blade portions 32 may be made to assume successively varying angular positions throughout their rotation, attaining their maximum and minimum pitches respectively at diametrically opposed points which may be selected in such manner as to permit universal angular steering of the rotor R.

While only the inner float ring 31 and the blades enclosed thereby have thus far been described, it may be found desirable to add an additional outer float ring 43 of hollow construction concentrically connected to the inner float ring 31 by a series of auxiliary fixed blades 44 of uniform pitch. However, since portions of these blades 44 will normally project above the surface of the water and be exposed to wave motion, it is desirable to give these particular blades a special conformation in order to minimize the effect of such wave motion on the equilibrium or stability of the rotor. To this end it will be seen that the outer radial ends of these blades 44 are substantially reduced in width or in other words in circumferential dimension to thus leave substatnial gaps 45 between adjoining blades 44 through which waves may pass with comparatively slight opposition.

In the embodiment now described the torque arm or ballast such as B is employed, not only to prevent rotation of the stator S, but also of the articulated tail section T.

To this end the arm B is of generally U-shaped configuration with its forward leg fixedly connected to and depending from the stub shaft 17 of the stator. Its radially outer ballast portion 12 extends axially across the exterior of the outer float ring 43 and includes an upwardly projecting rear leg 13 as is best shown in Figure 4. The upper end of this rear leg 13 is connected by means of a universal joint 46 to the articulated tail section T. Accordingly and by virtue of this arrangement the torque arm B serves to resist rotary movement of both the stator S and the tail section T, while permitting a certain degree of relative universal angular movement between these parts about the articulated connection between them formed by the universal joint 11 which interconnects them as above described.

It will be seen that this universal joint 11 is formed by the opposed vertical pivots 47 on the hollow stub shaft 18 at the rear end of the stator S, in conjunction with the intermediate ring 48 pivoted on such stub shafts, the ring 48 in turn being connected by horizontal pivots 49 to a rigid casing 50 in the forward end of the tail section T. On the forward wall or bulkhead 51 of the tail section T it is desirable to rotatably support a series of rollers 52 for engagement with the rear end wall 53 of hub 10, both to limit the articulate movement of the tail section T and also to prevent the frictional transmission of any rotational force from the end wall 53 to the tail section T such as might otherwise be caused by interengagement between these parts.

In order to provide for substantial water tight integrity of the rotor structure, the rotor hub 10 is journaled in substantially fluid tight manner on the respective stub shafts 17 and 18. Also on the projecting rearward end of the stub shaft 18 there is provided an integral flange 54, the outer edge which is connected by an extensible and collapsible bellows 55 to the face of the tail section forward bulkhead 51 around the forwardly opening casing 50 to thus protect the universal joint 11. Moreover by reference to Figures 4 and 8 considered jointly it will be seen that the forward terminal end of the tow cable C may be of hollow or tubular construction axially received in the rear end of tail section T to be passed through an opening in the end 55 of an axial passageway defined by the closed tube 56 and anchored in position by a collar 57 secured thereon in abutment with the wall 55.

Conduit or tube 14 earlier mentioned may enter the cable C at approximately the location 14a of Figure 1 and extends concentrically therethrough into the passageway 56. The passageway or tube 56 communicates with the interior of the stator 16 through the casing 50 and the hollow stub shaft 18 of the stator. Thus where the prime mover 20 comprises an electrical motor or motors, wires extending from the electrical generator of the auxiliary float A through the conduit 14 may be readily lead into the stator 16 and connected in circuit with the motors 20.

For further increasing the water tight integrity of the tail section T it will be desirable as shown in Figure 8 to provide a box 58 surrounding and walling off the opening which receives the universal joint 46. However, in order to permit access to this universal joint from within the tail section, the box 58 may be provided with a removable water tight hatch 59.

Despite all efforts to construct such a device in a completely water tight manner, it must be recognized that a certain amount of water will nevertheless accumulate therein both by leakage through the various journals and also by condensation. Accordingly provision is made for delivering this accumulated moisture to a common collection point from which it may be discharged by a usual bilge pump. Such a bilge pump 60 may be mounted on a bracket 61 at the forward end of the stator. The illustrated pump is of the centrifugal type having its discharge outlet communicating with a passage 62 opening radially into the stub shaft 17 of the stator and thence extending axially therethrough to its discharge end. The bearing 19 which supports the hub 10 on the stub shaft 17 is formed with an annular moisture collecting trap 63, as shown best in Figure 4, and by suitable passageway 64 this collected moisture is withdrawn from the trap into the intake side of pump 60. The trap not only serves to collect moisture seeping in between the bearing 19 and stub shaft 17 but in addition receives moisture through suction pipes 65 which are shown fragmentarily only in Figure 4, it being understood that these may communicate with various parts or areas of the rotor structure which may serve as sumps or collection points and thence be discharged through the pump 60 and passage 62.

The tail section T and/or the stator S may if desired house a crew for maintenance and operational purposes, this being made practical by virtue of the fact that both of these structures are maintained against rotation and moreover are in communication with each other. If desired, air may be supplied to such crew quarters T and/or S by means of a schnorkel arrangement such as generally disclosed in my prior Patent No. 2,655,890. However, it is contemplated that the quartering of a crew within the propulsion unit may not be necessary under all circumstances as its control may be accomplished completely through electrical control apparatus energized by conductors extending through the conduits 14 and controlling the operating of the prime movers 20 and also the cam ring 36.

Access of personnel to the tail T may be by means of watertight hatches, not shown. Access into the Stator section may be by passing from the tail section through the hollow stub shaft, or alternatively by hatches (not shown) in the rotor hub and in the Stator, brought into registry for this purpose.

In the embodiment of the invention illustrated in Figures 10 to 15 inclusive, the overall organization and arrangement of parts is generally similar to that hereinbefore described and similar parts are accordingly designated by corresponding but primed reference characters. The primary distinction between this embodiment and the one earlier described consists in a somewhat different application of driving mechanism. Thus in place of the prime movers 20 transmitting opposing rotational forces to the rotor R and to the torque arm B as in the earlier embodiment, such torque arm is completely eliminated as is the centrally located prime mover of the earlier form. In place of these elements the inner ring 31' of the rotor houses a pair of radially spaced concentric inner and outer tracks 101 and 102 between which is guided a motorized weighted carriage 103 having inner and outer sets of traction wheels 104 and 105 respectively running on and frictionally engaging these respective tracks. The weighted car or carriage 103 consists essentially of a powerful electric motor which preferably transmits power to both sets of wheels and which is energized by means of the brush 106 (see Figure 12) in operative wiping engagement with a commutator ring 107 disposed within the ring 31' adjacent and concentric to the tracks 101 and 102.

Electrical energy may be delivered to commutator ring 107 by conductors extending through the conduit 14 to brush 108 carried by a radial arm 109 on the stator stub shaft 18' in wiping electrical contact with a commutator ring 110 mounted interiorly of the hollow hub 10' and from the commutator ring 110 any suitable arrangement of conductors (not shown) may carry the electrical energy to the commutator ring 107 heretofore described.

Figure 12:
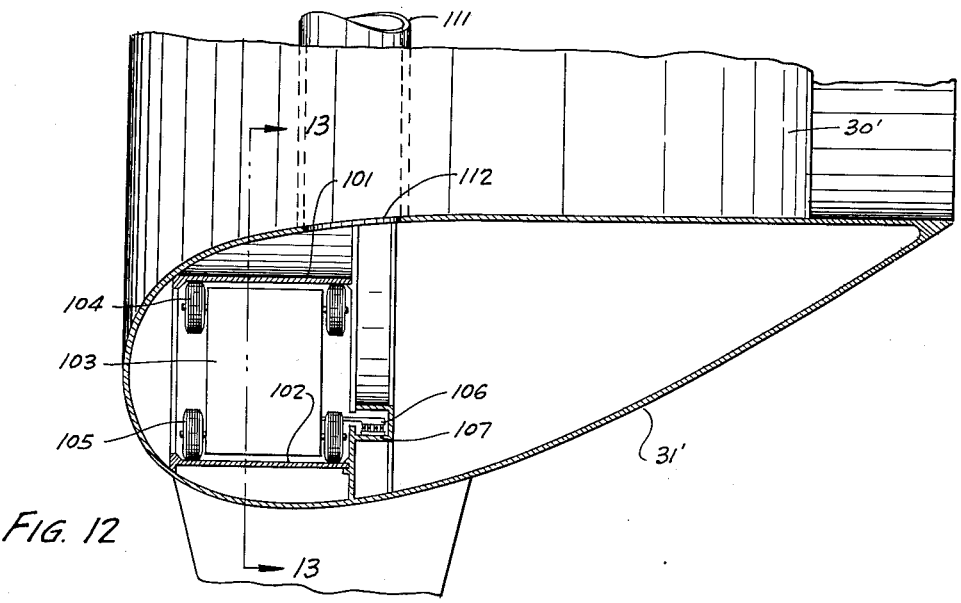
Figure 12 is a fragmentary view, partly in elevation and partly in radical cross section through the inner float ring, showing the arrangement therein of the driving mechanism for this particular embodiment of the invention.
Figure 13:
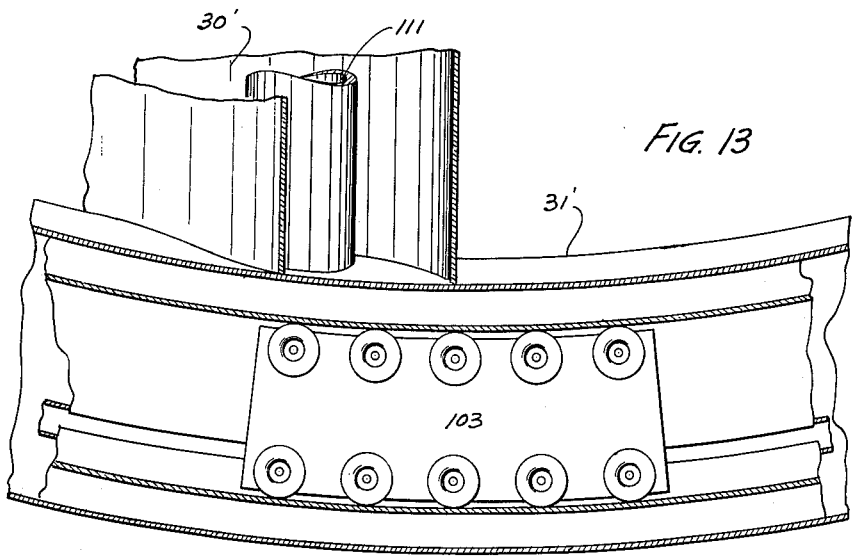
Figure 13 is a cross section on the line 13—13 of Figure 12.
Figure 14:
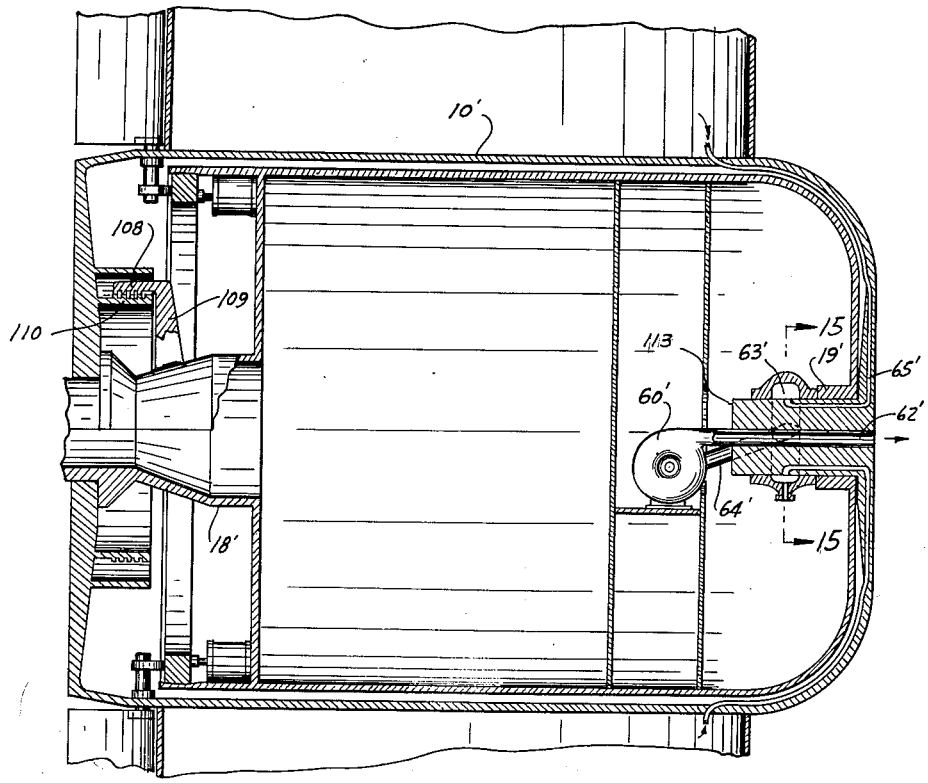
Figure 14 is a sectional view through the stator of the modified form of the invention this view being taken on the same plane as and corresponding to Figure 4.

In order to permit access to the weighted car or carriage 103 for maintenance and repair purposes there may be provided a hollow access shaft 111 as in Figure 12. It will be understood that such a shaft 111 extends radially through one of the fixed propeller blades 30 and thence through the opening 112 in the ring 31' to establish communication between this ring and the hollow stator of the device through openings not shown in the hollow hub section 10' and the stator shell which may be brought into registry for this purpose.

The arrangement of the bilge pump 60' is generally similar to that heretofore disclosed. The pump has its inlet passage 64' communicating with and withdrawing water from the fluid trap 63' in bearing 19' in substantially the manner heretofore described in connection with the preferred embodiment. Moisture is delivered into this trap 63' by conduits 65' from any of various collection sources or sumps in the rotor structure (not specifically illustrated) and the pump discharges the collected water through a passage 62' which, in this instance, extends completely axially through the stud shaft 113. The stub shaft 113 is carried by and fixed to the hub 10' and the bearing 19' is carried by the stator, thus constituting an inverse of the arrangement heretofore described in the preferred embodiment. This has the advantage that the forward end of the hub 10' may completely enclose the forward end of the stator, and thereby eliminate the entry of water between the bearing 19' and shaft 113 such as inherently exists in the structure earlier described.

Figure 15:
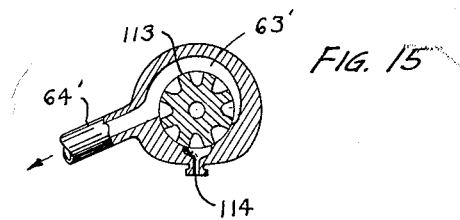
Figure 15 is a detailed section taken on the line 15—15 of Figure 14.

In this embodiment therefore the bearing 19' and its fluid trap 63' rotate about the stub shaft 113 and the radially outwardly opening discharge ends of the several conduits 65'. In order to prevent the formation of a vacuum within the conduits 65', and as shown in Figure 15, it is desirable to provide a vent 114 opening through the bearing and permitting a small amount of air from the interior of the stator to be drawn into said conduits.

Figure 10:
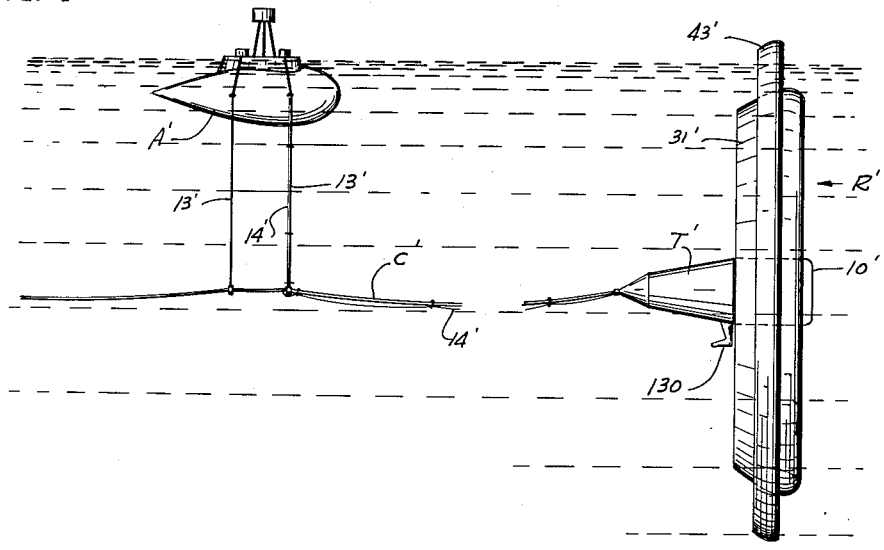
Figure 10 is a view generally similar to Figure 1, though on a comparatively reduced scale and showing a slightly modified embodiment of the invention.
Figure 11:
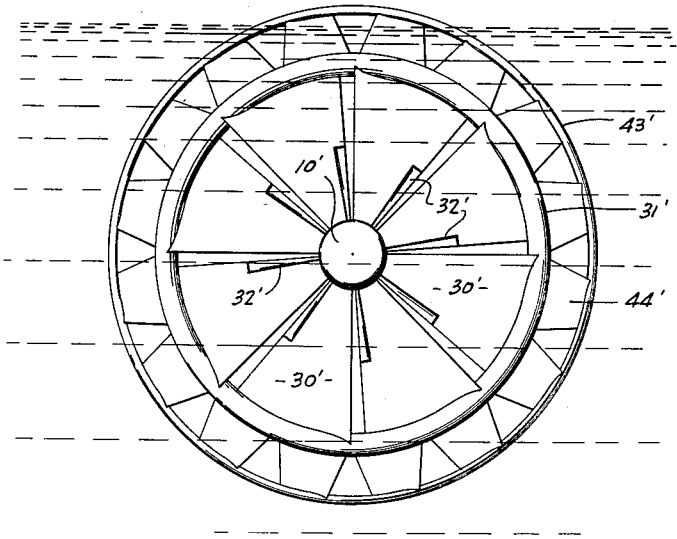
Figure 11 is a front end elevation of the propulsion unit of Figure 10 as operatively disposed in the water.

In this modification of the invention it will be noted that the tail section T' of the stator is provided with its own depending ballast, designated by the numeral 130 in Figure 10.

Having thus described my invention I claim:

1. A low speed marine propulsion unit comprising a hollow cylindrical stator, ballast means associated with said stator for resisting rotation thereof about its cylindrical axis, a propeller journaled on said stator for rotation about said cylindrical axis, said propeller including a plurality of changeable pitch propeller blades mounted for relatively independent pitch changing movement about axis extending generally radially with respect to said cylindrical axis, drive means carried by said propulsion unit and operatively connected to said propeller for rotating the propeller, cam followers rigidly connected to the respective blades in eccentric relation to their said radial axis, a cam element carried by said stator concentrically with said cylindrical axis for universal angular adjustment about its center relative to said cylindrical axis, said cam element having an annular axially presented cam track in operative engagement with said respective cam followers, and means within said stator operatively connected to said cam element for selectively varying the said universal angular adjustment of the cam element.

2. A low speed marine propulsion unit as defined in claim 1 in which said drive means comprises a prime mover housed in said stator and means interconnecting said prime mover and said propeller for transmitting rotary movement from the prime mover to the propeller.

3. An aquatic propulsion unit comprising a hollow cylindrical stator, means for connecting an object to be towed to one axial end of said stator in alignment with the cylindrical axis of said stator, a propeller having a hollow hub disposed for rotation about said stator and its cylindrical axis, said propeller having a plurality of propeller blades disposed concentrically about said cylindrical axis, at least some of said blades having portions disposed for pitch changing movement about axes extending generally radially to said stator axis, drive means carried by said propulsion unit in driving relation with said propeller for rotating the propeller about the stator, a circular cam carried by said stator generally concentrically to said stator axis, said cam having an annular cam surface directed axially of the stator, said cam being mounted for universal angular adjustment relative to said stator axis, control means in said stator operatively connected with said cam for universally angularly adjusting said cam, and a cam follower carried by each said blade portion in operative engagement with said cam track for individually governing the pitch of each said portion in accordance with its angular position of rotation around said track.

4. An aquatic propulsion unit comprising a hollow cylindrical stator, a propeller having a hollow hub encompassing and disposed for rotation about the cylindrical axis of said stator, said propeller having a plurality of propeller blades disposed concentrically about said cylindrical axis, at least some of said blades having portions disposed for pitch changing movement about axes extending radially to said cylindrical axis, drive means carried by said propulsion unit in driving relation with said propeller for rotating the propeller about said stator, a circular cam carried by said stator generally concentrically to said stator cylindrical axis, said cam having an annular cam surface directed axially of the stator, said cam being mounted for universal angular adjustment about its center relative to said stator axis, control means in said stator operatively connected with said cam for universally angularly adjusting said cam, and a cam follower carried by each said blade portion in operative engagement with said cam track for individually governing the pitch of each said blade portion in accordance with its angular position of rotation around said track.

5. A marine propulsion unit comprising a stator, ballast means carried by said stator for resisting rotary movement of said stator about a given axis, said ballast means being disposed eccentrically to said given axis, a propeller encompassing and disposed for rotation about said stator and its said axis, said propeller having a plurality of propeller blades disposed concentrically about said axis, at least some of said blades having portions disposed for pitch changing movement about axes which extend generally radially to said given axis, drive means carried by said propulsion unit in driving relation with said propeller for rotation the propeller about said given axis, a circular cam carried by said stator generally concentrically to said given axis, said cam having an axially directed cam surface and being mounted for universal angular adjustment about its center relative to said given axis, control means in said stator operatively connected with said cam for universally angularly adjusting said cam with respect to said given axis, and means operatively connecting the respective blade portions in controlled relation to said cam for enabling the cam to individually govern the pitch of each said portion in accordance with its angular position of rotation around said cam.

6. A marine propulsion unit comprising a stator and means associated with said stator for resisting rotary movements thereof about a given axis, a propeller mounted on said stator for rotation about said given axis, said propeller having a plurality of blades disposed for pitch changing movement about axes extending generally radially to said given axis, drive means carried by said propulsion unit in driving relation with said propeller for rotating the propeller about said given axis, a control element carried by said stator and means individually associated with each of the said blades, said means being in operative controlled engagement with said control means for individually varying the pitch of each said blade to an extent dependent with its rotational position about said given axis.

7. A marine propulsion unit comprising a hollow cylindrical stator, a propeller having a hollow hub encompassing and disposed for rotation about said stator and its cylindrical axis, said propeller having a plurality of propeller blades disposed concentrically about said cylindrical axis, at least one of said blades being disposed for pitch changing movement about an axis extending radially to said cylindrical axis, drive means within said propulsion unit in driving relation with said propeller for rotating the propeller about said stator axis, and control means carried by said stator and operatively connected to the said changeable pitch propeller blade for changing the pitch of said propeller blade in accordance with its rotational position about said cylindrical axis.

8. A low speed marine propulsion unit comprising a hollow cylindrical stator, ballast means associated with said stator for resisting rotation thereof about its cylindrical axis, a propeller journaled on said stator for rotation about said cylindrical axis, said propeller including a changeable pitch propeller blade mounted for pitch changing movement about an axis extending generally radially to said cylindrical axis, drive means carried by said propulsion unit for rotating said propeller about said cylindrical axis, cam followers rigidly connected to said changeable pitch propeller blade in eccentric relation to its said radial axis, a cam element carried by said stator concentrically with said axis for universal angular adjustment about its center relative to said axis, said cam element having an axially presented cam track in operative engagement with said follower, and means within said stator operatively connected to said cam element for adjusting the angular relationship of the cam element to said cylindrical axis.

9. A low speed marine propulsion unit comprising a hollow cylindrical stator, a propeller journaled on said stator for rotation about a predetermined axis, ballast means associated with said stator for preventing its rotation about said axis, said propeller including a plurality of fixed pitch propeller blades and a plurality of changeable pitch flaps mounted on the respective blades for relatively independent pitch changing movement about axes extending generally radially to said predetermined axis, drive means carried by said propulsion unit for rotating said propeller, cam followers rigidly connected to said changeable pitch blades in eccentric relation to their said generally radial axes, a cam element carried by said stator concentrically with said axis for universal angular adjustment about its center relative to said axis, said cam element having an annular axially presented cam track in operative engagement with said respective followers, and means within said stator operatively connected to said cam element for selectively varying the said universal angular adjustment of the cam element.

10. A low speed marine propulsion unit comprising a hollow cylindrical stator, ballast means associated with said stator for resisting rotation thereof about its cylindrical axis, a propeller journaled on said stator for rotation about said cylindrical axis, said propeller including a plurality of changeable pitch propeller blades mounted for relatively independent pitch changing movement about generally radial axes, drive means carried by said propulsion unit for rotating said propeller, cam followers rigidly connected to the respective blades in eccentric relation to their said generally radial axes, a cam element carried by said stator for angular adjustment relative to said cylindrical axis about a point which intersects said cylindrical axis, said cam element being in operative controlling engagement with said respective followers.

11. A low speed marine propulsion unit such as defined in claim 10 wherein said cam element is laterally angularly adjustable to control the steering of the marine propulsion unit.

12. A low speed marine propulsion unit such as defined in claim 10 wherein said cam element is vertically angularly adjustable to control the vertical inclination and depth of operation of the unit.

13. A marine propulsion unit as defined in claim 1 in which said cylindrical stator includes an articulated tail section pivotally connected to the balance of the stator in trailing relation, said tail section including means for connecting a tow line thereto in axial alinement with said stator, the said connection of said tail section to the balance of the stator permitting free and relatively unimpeded angular steering movement of the propeller.

14. The combination of claim 1 wherein said propeller includes a float ring interconnecting the ends of its respective blades, said float ring being hollow, an annular track way within said float ring, said drive means comprising a weighted carriage disposed for movement around said annular track, said carriage have propelling means carried thereby whereby such movement of the carriage will cause rotation of the propeller.

15. A marine propulsion unit comprising a rotor disposed for rotation in the water about a predetermined axis, a plurality of fixed propeller blades on said rotor radiating from said axis, means carried by said unit for rotating the rotor about said axis, and variable thrust producing means carried by said rotor eccentrically to said axis and arranged to produce thrust in the direction of said axis, said thrust producing means being relatively independently controllable to vary the thrust produced by each, including control means operatively connected to said thrust producing means for varying the thrust of the respective said means successively in accordance with the rotational position of each said thrust producing means.

16. A marine propulsion unit as defined to claim 15, including a stator concentric to and rotatably associated with said rotor, means cooperating with the stator for restraining said stator against rotation with the rotor, a cam element carried by said stator in controlling relation with said thrust producing means, for varying the thrust of said respective means in accordance with the rotational position of each such means about its axis.

17. A marine propulsion unit as defined in claim 15 in which the diameter of said rotor exceeds its axial dimension.

18. A marine propulsion unit as defined in claim 15 wherein said rotor includes an inner float ring disposed concentrically about the outer ends of said propeller blades.

References Cited in the file of this patent

UNITED STATES PATENTS

| | | |
|---|---|---|
| 1,370,587 | Jackson | Mar. 8, 1921 |
| 2,095,734 | Dornier | Oct. 12, 1937 |
| 2,369,034 | Farkas | Feb. 6, 1945 |

FOREIGN PATENTS

| | | |
|---|---|---|
| 691,766 | France | July 21, 1930 |